United States Patent [19]
Smet

[11] Patent Number: 5,101,918
[45] Date of Patent: Apr. 7, 1992

[54] HIGH PRESSURE PIPE AND DEVICE FOR MAKING A HOLE IN THE GROUND, PROVIDED WITH SUCH HIGH PRESSURE PIPE

[76] Inventor: Marc J. Smet, Kasteelstraat 29, 2400 Mol, Belgium

[21] Appl. No.: 592,043

[22] Filed: Oct. 3, 1990

[30] Foreign Application Priority Data

Oct. 6, 1989 [BE] Belgium .................. 08901074

[51] Int. Cl.⁵ .................. E21B 7/18; E21B 17/20
[52] U.S. Cl. .................. 175/424; 138/114; 138/127; 175/67; 175/203
[58] Field of Search .................. 175/67, 424, 203, 215; 299/17; 138/108, 110, 113, 114, 127, 131, 133, 139, 148; 134/167 C, 168 C

[56] References Cited

U.S. PATENT DOCUMENTS

| | | | |
|---|---|---|---|
| 1,831,209 | 11/1931 | Thornley et al. | 175/424 |
| 2,258,001 | 10/1941 | Chamberlain | 175/424 |
| 2,402,003 | 6/1946 | Zublin | 138/139 |
| 3,061,024 | 10/1962 | Thompson | 138/113 |
| 3,578,029 | 5/1971 | Cullen et al. | 138/139 |
| 3,791,415 | 2/1974 | Lawless et al. | 138/127 |
| 3,799,440 | 3/1974 | Goss et al. | 138/114 |
| 3,831,635 | 8/1974 | Burton | 138/114 |
| 3,873,156 | 3/1976 | Jacoby | 175/424 |
| 3,974,862 | 8/1976 | Fuhrmann | 138/114 |
| 4,274,549 | 6/1981 | Germain | 138/113 |
| 4,850,440 | 7/1989 | Smet | 175/67 |
| 4,921,057 | 5/1990 | Smet | 175/67 |
| 5,005,613 | 4/1991 | Stanley | 138/114 |

FOREIGN PATENT DOCUMENTS

256601A1  2/1988  European Pat. Off. .

Primary Examiner—Stephen J. Novosad
Attorney, Agent, or Firm—Foley & Lardner

[57] ABSTRACT

A high pressure pipe consisting of a flexible high pressure hose which is attached at both ends to a tube. The tube is stiffer than the high pressure hose in order to allow the high pressure hose to be pushed into the ground without bending or buckling and thereby forming a hole in the ground.

9 Claims, 2 Drawing Sheets

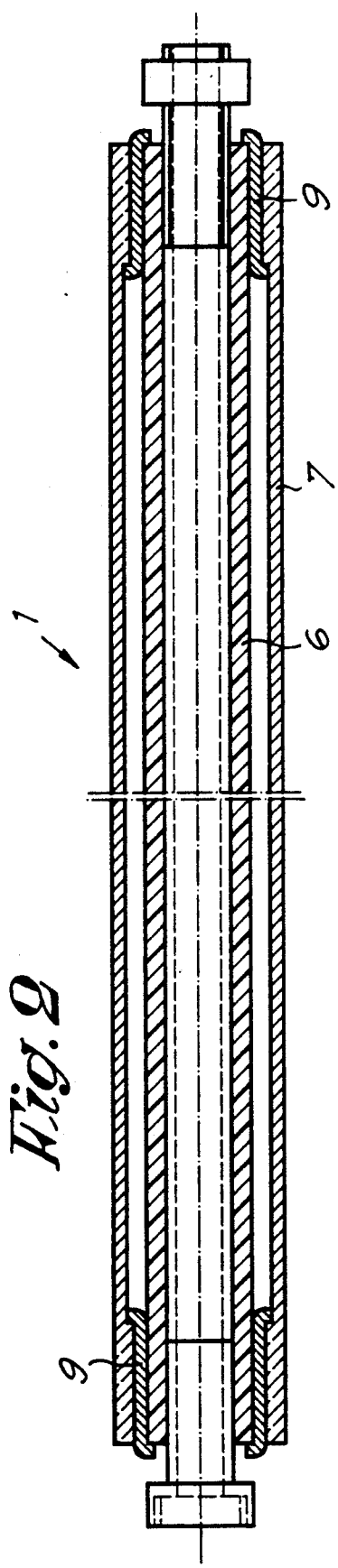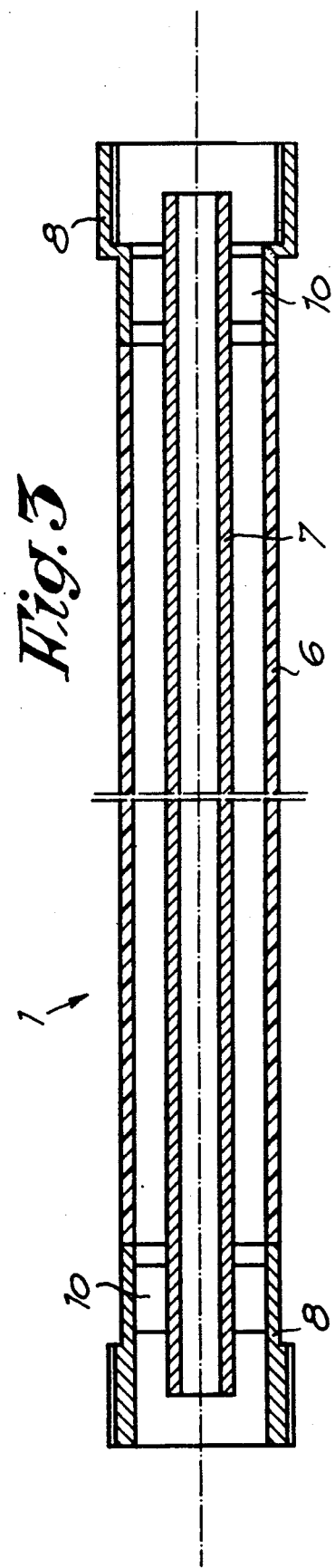

HIGH PRESSURE PIPE AND DEVICE FOR MAKING A HOLE IN THE GROUND, PROVIDED WITH SUCH HIGH PRESSURE PIPE

BACKGROUND OF THE INVENTION

1. Field of the Invention

The invention relates to a high pressure pipe which contains a flexible high pressure hose.

2. Description of the Related Art

High pressure hoses are generally known for the transport of fluid under relatively high pressure. These hoses can for example, be formed by a fabric of nonelastic threads or bundles of threads woven at an angle in relation to the longitudinal direction of the hose, and which can possibly be imbedded in supple plastic. These hoses resist very high pressures, even up to 1000 kg/cm$^2$, but are, even when they are filled with fluid under pressure, very flexible and supple.

This flexibility can in certain applications be an advantage but for other applications is unacceptable. The latter situation is, for example, the case where the high pressure pipe connects to a spray nozzle for making a hole in the ground and at least where the spray nozzle has to be pushed forward into the ground by the high pressure hose. By pushing the nozzle with with the supple high pressure hose, this hose is going to bend or buckle. If the hose is unwound from a drum, it can be flattened at the location of the guides which direct the hose when pushing it into the ground. It is for that reason that in the above mentioned applications situation, use is not made of high pressure hoses but of relatively stiff pipes which, for example, are made of metal. Ordinary metal pipes are however not resistant to very high pressures. Therefore high pressure pipes must be made from special alloys, which are relatively expensive, or of cheaper material, such as steel, which must then, however, be produced very thick in order to withstand the high pressure, and are therefore also relatively expensive. In the last case, where thick stiff pipes are used these pipes are totally untransformable, and it is therefore impossible to wind them up onto or unwind them from a drum, such as for example with the procedure and device for making a hole in the ground according to Belgian patent no. 905 265.

SUMMARY OF THE INVENTION

The purpose of the invention is to remedy these disadvantages and to provide a high pressure pipe which contains a flexible high pressure hose but that still has a relatively great stiffness in order for it to be used for pushing a spray nozzle forward when making a hole in the ground.

For this purpose the high pressure pipe also contains at least a relatively stiff pipe which gives sufficient stiffness to the flexible hose.

The high pressure hose is preferably of the type having nonelastic threads or bundles of nonelastic threads woven at an angle in relation to the longitudinal direction of the hose.

In a particular embodiment of the invention the supple hose and the relatively stiff pipe are attached to each other on the ends.

The relatively stiff pipe can surround the flexible hose or conversely the flexible hose can surround the relatively stiff pipe so that in the latter case, a space remains between the hose and the pipe for fluid under pressure.

A high pressure pipe according to one of the aforementioned embodiments can be applied very effectively in a device for making a hole in the ground. With most such hole making devices, a fluid under high pressure must always be directed toward a nozzle which is attached onto the extremity of the high pressure pipe. Furthermore, in most cases it is very effective when the high pressure pipe has a relatively great stiffness in order to allow, with assistance of the pipe, the nozzle to be pushed along in the direction of movement and/or to avoid a torsion of the high pressure pipe. Thus, the nozzle has a well defined known position in relation to the high pressure pipe, which may be used for directing the nozzle.

The invention also relates to a device for making a hole in the ground, which device contains a high pressure pipe according to one of the aforementioned embodiment, a nozzle connected onto an extremity thereof, and connected onto the other extremity thereof, a means for directing fluid under pressure through this high pressure pipe.

Other details and advantages of the invention will appear from the following description of a high pressure pipe and of a device for making a hole in the ground provided with such high pressure pipe, according to the invention. This description is only given as an example, and does not restrict the invention in any way. The reference numbers relate to the drawings attached hereto.

BRIEF DESCRIPTION OF THE DRAWINGS

FIG. 2 represents a longitudinal section of a part of the high pressure pipe from the device according to FIG. 1.

FIG. 3 represents a longitudinal section analogue to that of FIG. 2, but in relation to another embodiment of the high pressure pipe according to the invention.

DETAILED DESCRIPTION OF THE PREFERRED EMBODIMENTS

Figure 1:
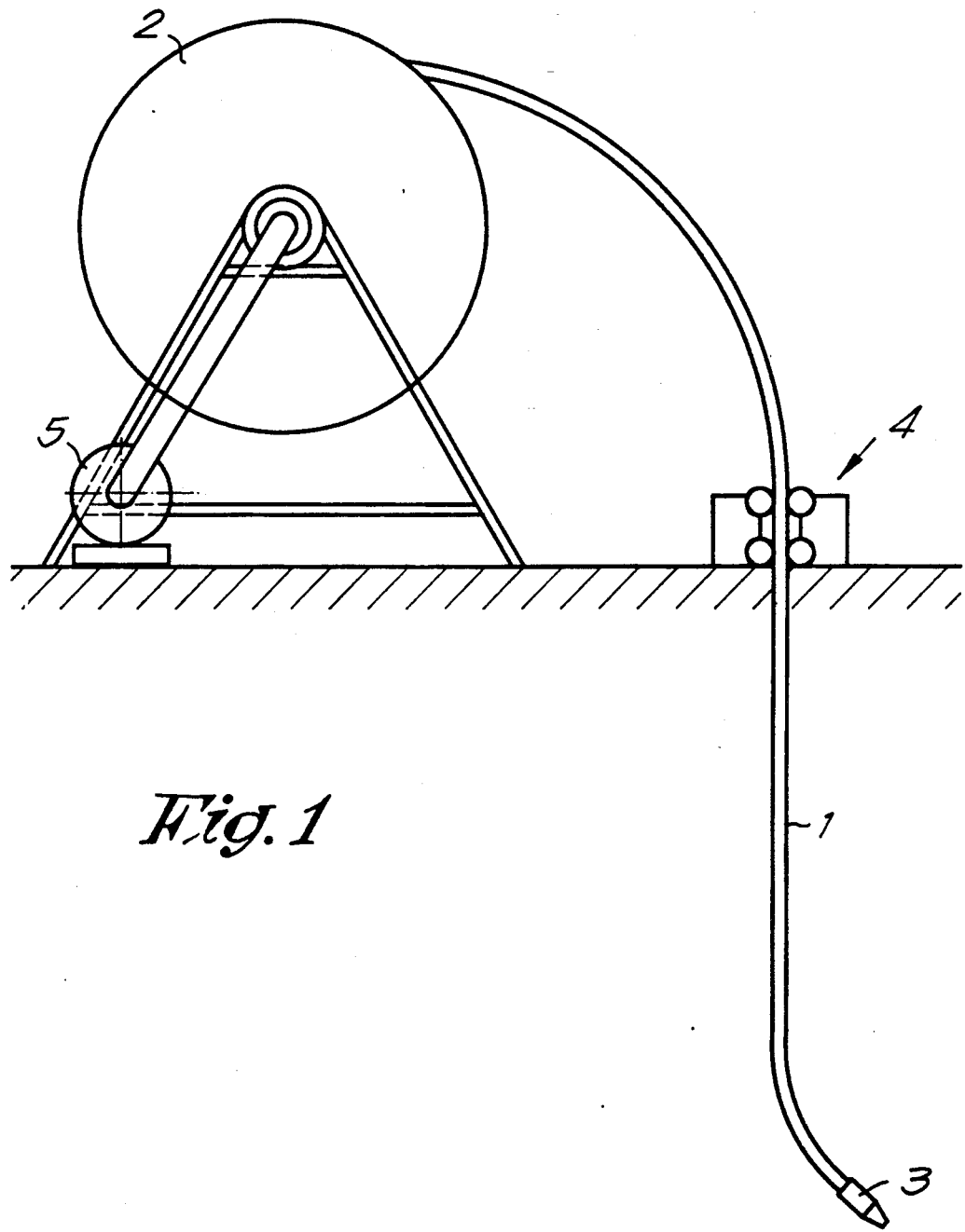
FIG. 1 is a schematically maintained side view of a device for making a hole in the ground according to the invention.

In the various figures the same reference numbers relate to the same elements.

The device for making a hole in the ground according to FIG. 1 contains in a known manner a high pressure pipe 1 which is unwound from a drum 2 mounted above the ground and which bears a directable spray nozzle 3 on its front extremity. The directable spray nozzle 3 is in itself known. A suitable spray nozzle is for example a spray nozzle as described in the Belgian patent no. 905 265. Just above the ground, the unwound high pressure pipe is pulled in the desired direction for penetrating into the ground by a guiding mechanism 4 with rollers. With assistance of a pump 5, the liquid under high pressure is pumped through the high pressure pipe 1 toward the nozzle 3.

Characteristic for the invention is the high pressure pipe 1 which, as is represented in detail in FIGS. 2 and 3, principally consists of a high pressure hose 6 and a relatively stiff but nevertheless still somewhat flexible tube 7. The high pressure hose 6 is of the type with nonelastic threads or bundles of threads which are woven at an angle in relation to the longitudinal direction of the hose 1. In addition to the fabric, the hose 1 contains one or more other layers, for example a layer of supple plastic. Through the fabric the hose can resist high pressures and has a maximum diameter which is also not exceeded at high pressure. These high pressures are pressures going for example from 100 kg/cm² up to 1000 kg/cm².

The relatively stiff but nevertheless flexible tube 7 needs to have such stiffness that the whole of the high pressure pipe 1 can be utilized for pushing the nozzle 3 forward into the ground. This tube 7 also needs to be sufficiently flexible so that the high pressure pipe 1 would be able to be wound up onto a drum 2. Suitable materials for the tube 7 are formed by steel and glass fibers (fiberglass).

The high pressure hose 6, and the relatively stiff tube 7 are mechanically attached to each other on the ends. The high pressure pipe 1 can consist of one piece or of various lengths which are connected to each other. In FIGS. 2 and 3 such a length is represented. The various lengths are coupled to each other by means of couplings 8 on the extremities of the high pressure hose 6. The tubes 7 are not coupled directly to each other since they are attached at their extremities to the high pressure hoses 6.

In the embodiment according to FIG. 2 the relatively stiff tube 7 surrounds the supple hose 6. The mechanical connection between the extremities of the hose 6 and the tube 7 are each formed by a coupling sleeve 9 which on the one hand hooks over an inwardly protruding collar of the tube 7 and on the other hand hooks over the farthest edge of the actual hose 6 as represented in FIG. 2. The high pressure liquid flows through the high pressure hose 6. The annular space between the hose 6 and the tube 7 remains empty. In this annular space, electric wires can be installed for working or controlling electric apparatus which are arranged in the directable nozzle 3.

The embodiment of the high pressure pipe according to FIG. 3 differs from the embodiment according to FIG. 2 through the fact that the relatively stiff tube 7 is located within the high pressure hose 6. The mechanical coupling between the extremities of the high pressure hose 6 and the tube 7 is formed by radial connections 10 between the tube 7 and the couplings 8 so that liquid under pressure can flow through the high pressure pipe 1 around the tube 7.

Liquid under high pressure can also flow through the tube 7, in which case it is preferred that the tube 7 is provided with openings through which the inside of the tube 7 is connected to annular space between the tube 7 and hose 6.

Insofar the tubes 7 of the various lengths of the high pressure pipe 1 connect to each other in a practically leakproof manner, for example are connected to each other by couplings, when the hoses 6 of the lengths are coupled to each other, a liquid under low pressure can be pumped through the pipe 1. The high pressure pipe then consists of two coaxial pipes in the nature of the double pipe which is utilized in the device described in the Belgian patent no. 905 265.

Also with the embodiment according to FIG. 3, electric wires can run through the spaces formed between the hose 6 and the tube 7. These electric wires can also extend through the pipe 7.

A liquid under very high pressure can be pumped in all the above described embodiments of the high pressure pipe, but with the assistance of the high pressure pipe 1 the nozzle 3 can still be pushed into the ground. The tube 7 can be of relatively light construction since it does not have to resist the high pressures, but must give the necessary stiffness to the high pressure hose, which receives the high pressures. Because of the tube 7, in the embodiment according to FIG. 3, the high pressure pipe 1 cannot be entirely flattened. In this latter case, for example, the outer hose can be somewhat flattened by the guiding mechanism 4. However, at the very most it can only be flattened against the tube 7, whereby the hose would have an oval cross-section and still possess the necessary space on both sides of the tube 7 for the passage of the liquid under pressure.

The invention is in no way restricted to the embodiments described above, and within the scope of the patent application many changes can be applied to the described embodiments, among others with regard to the shape, the composition, the arrangement and the number of the parts which are utilized for the implementation of the invention.

In particular the high pressure pipe need not necessarily consist of lengths attached to each other.

The relatively stiff tube need not necessarily be windable on a drum or even be somewhat flexible. This tube can be very rigid. The invention also does not only relate to a high pressure pipe for driving a head for making a hole in the ground. The invention is also applicable in all cases where the pipe must resist high pressures but must nevertheless have an adequate stiffness.

I claim:
1. A high pressure pipe, comprising:
   a flexible high pressure hose;
   a tube, having smooth inner and outer sides, surrounded by the high pressure hose and defining a space therebetween;
   wherein the high pressure hose and the tube are permanently attached to each other at both ends, the tube being stiffer than the high pressure hose and having openings through the sides allowing communication between the space and the inside of the tube whereby liquid under pressure flows through the tube and the space.

2. A high pressure pipe according to claim 1, wherein the high pressure hose has at least one of nonelastic threads and bundles of nonelastic threads which are woven at an angle relative to the longitudinal direction of the hose.

3. A high pressure pipe according to claim 1, wherein the tube is a metal tube.

4. A high pressure pipe according to claim 1, wherein the tube is a glass fiber tube.

5. A high pressure pipe according to claim 1, further comprising various lengths and couplings;
   wherein the various lengths are attached to each other by the couplings, the couplings being installed on the high pressure hoses of the various lengths.

6. A high pressure pipe, comprising:
   a flexible high pressure hose;
   a tube, having smooth inner and outer sides, surrounded by the high pressure hose and defining a space therebetween;
   wherein the high pressure hose and the tube are permanently attached to each other at both ends such that the space is in communication with the inside of the tube, and the tube is stiffer than the high pressure hose.

7. A high pressure pipe, comprising:
   a flexible high pressure hose;

a tube, having smooth inner and outer sides, surrounding the high pressure hose and defining a space therebetween;

wherein the high pressure hose and the tube are permanently and sealingly attached to each other at both ends such that the space is sealed, and the tube is stiffer than the high pressure hose.

8. A high pressure pipe comprising:

various lengths, each length comprising a flexible high pressure hose, and a tube, having smooth inner and outer sides, surrounding the high pressure hose and defining a space therebetween;

couplings connecting the various lengths to each other;

wherein the high pressure hose and the tube are permanently and sealingly attached to each other at both ends, and the tube is stiffer than the high pressure hose; and wherein the couplings are exclusively installed on the high pressure hoses of the various lengths.

9. A device for making a hole in the ground, comprising:

a flexible high pressure hose;

a tube, having smooth inner and outer sides, surrounding the high pressure hose and creating a space therebetween, said hose and tube being permanently attached to each other at both ends;

a nozzle connected to one end of the hose;

means, connected exclusively to the other end of the hose, for directing fluid under pressure exclusively through the hose such that the space remains empty of any fluid; and wherein the tube is stiffer than the high pressure hose.

* * * * *